United States Patent [19]

Bloom et al.

[11] Patent Number: 5,304,413
[45] Date of Patent: Apr. 19, 1994

[54] MOLDED PVF LAMINAR STRUCTURES

[75] Inventors: Joy S. Bloom; Robert F. Davis, both of Wilmington, Del.

[73] Assignee: E. I. Du Pont de Nemours and Company, Wilmington, Del.

[21] Appl. No.: 875,462

[22] Filed: Apr. 29, 1992

[51] Int. Cl.⁵ .................. B32B 7/02; B32B 27/08
[52] U.S. Cl. .................. 428/215; 428/412; 428/421; 428/245; 428/304.4; 528/180; 528/207; 525/150; 526/207
[58] Field of Search ............ 428/215, 412, 304.4, 428/421, 245; 528/180, 207; 525/150; 526/207

[56] References Cited

U.S. PATENT DOCUMENTS

| 4,810,540 | 3/1989 | Ellison et al. | 428/32 |
| 4,936,936 | 6/1990 | Rohrbacher | 156/239 |
| 4,937,135 | 6/1990 | Bloom | 428/215 |

Primary Examiner—P. C. Sluby
Attorney, Agent, or Firm—Richard H. Burgess

[57] ABSTRACT

Laminar structures of PVF and substantially amorphous resin such as PEKK, backfilled with injection molding resin, exhibit an excellent combination of physical and aesthetic properties.

9 Claims, No Drawings

MOLDED PVF LAMINAR STRUCTURES

BACKGROUND OF THE INVENTION

Polyvinylfluoride (PVF), commercially available in film form, is used in a wide variety of protective and decorative applications. Typically, PVF is laminated to another surface. For example, it is often the top surface on aluminum or polyvinyl chloride panels used for house siding.

PVF has also been used for surfacing interior aircraft panels, bonded to a substrate that forms the basic structural component of such panels. Bloom, in U.S. Pat. No. 4,937,135, describes thick laminates of PVF and polyaryletherketoneketone (PEKK), in which the thickness of the PEKK is greater than about 625 micrometers.

Still other laminar structures have previously been developed which, through careful regulation of the thicknesses of the components, can be embossed without the inclusion of embossing resin.

Despite prior improvements in this area, particular difficulty has been encountered in the past in the preparation of complex shapes. For example, passenger service units for aircraft interiors are difficult to surface with prior laminates, the performance properties of which would otherwise suit them well for such uses. Moreover, particularly in aircraft construction, materials are desirable which generate little or no smoke when exposed to high temperatures.

SUMMARY OF THE INVENTION

The present invention provides a laminar construction and a method for its preparation which permits the fabrication of large shaped objects with the desirable performance characteristics of an exterior surface of PVF.

Specifically, the present invention provides a laminar structure comprising, and bonded together in the order specified,
(a) at least one layer of polyvinyl fluoride film having a thickness of about from 12.5 to 200 micrometers;
(b) at least one layer bonded to (a) having a thickness of about from 25 to 500 micrometers and consisting essentially of at least one substantially amorphous polymer selected from
  (i) polycarbonate
  (ii) polyaryletherketoneketone consisting essentially of repeating units of the formula:

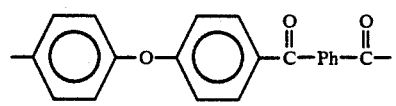

wherein Ph is either the 1,4-phenylene, the 1,3-phenylene group or mixtures thereof, the ratio of 1,4-phenylene groups to 1,3-phenylene groups being about from 70:30 to 0:100;
  (iii) polyarylate and
  (iv) polyvinyl chloride alloy; and
(c) a polymeric substrate having thickness of at least about 500 micrometers.

The present invention further provides a process for the preparation of a laminar structure comprising:
(a) laminating at least one layer of polyvinyl fluoride having a thickness of about from 12.5 to 200 micrometers and at least one layer of substantially amorphous polymer having a thickness of about from 25 to 500 micrometers selected from
  (i) polycarbonate
  (ii) polyaryletherketoneketone consisting essentially of repeating units of the formula:

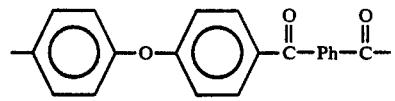

wherein Ph is either the 1,4-phenylene, the 1,3-phenylene group or mixtures thereof, the ratio of 1,4-phenylene groups to 1,3-phenylene groups being about from 70:30 to 0:100;
  (iii) polyarylate and
  (iv) polyvinyl chloride alloy; and
(b) shaping the resulting laminate to substantially conform to the shape of a mold; and
(c) injection molding a thermoplastic resin onto the substantially amorphous polymer to a thickness of at least about 2500 micrometers.

DETAILED DESCRIPTION OF THE INVENTION

PVF films which can be used in the present invention include those described in Hecht, U.S. Pat. No. 3,265,678, hereby incorporated by reference. At least one PVF layer is used in the present invention, and two or more are often preferred in decorative applications, as, for example, when a decorative design is printed on the surface of one PVF layer. In these cases, a clear protective layer of PVF is placed over the printed surface. More often, however, the outer PVF layer is colored with one or more pigments or dyes. Each of the PVF layers should be about from 12.5 to 200 micrometers.

The layer bonded to the PVF should be thermoformable below a temperature of about 200° C., and have a thickness of about from 25 to 500 micrometers. Materials which can be used for this layer include polycarbonate; PEKK, such as those described in Bloom, U.S. Pat. No. 4,937,135, therein identified as polyaryletherketone; polyarylate; and polyvinyl chloride alloys.

Of the PEKK compositions disclosed in the Bloom patent, those preferred for use in the present invention consist essentially of repeating units of the formula:

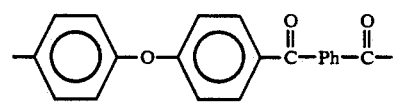

wherein Ph is either the 1,4-phenylene, the 1,3-phenylene group or mixtures thereof, the ratio of 1,4-phenylene groups to 1,3-phenylene groups being about from 70:30 to 0:100.

Still other polymers which can be used for this layer include polyarylates and polyvinyl chloride alloys. This latter term is used in its usual sense, as described for example, in the Engineered Materials Handbook, Volume 2, Engineering Plastics, Polyvinyl Chlorides (PVC) (1988).

PEKK is generally preferred for use in the present invention because its excellent heat resistance and low smoke generation characteristics make it particularly well suited to aircraft applications. The physical properties of polycarbonate also makes it preferrable in certain applications. Blends of two or more polymers can also be used for this layer of the present structures.

The layer bonded to the PVF in the present invention should be substantially amorphous. Accordingly, the polymer should exhibit a crystallinity, as measured by standard Differential Scanning Calorimetry techniques, of less than about 5%. In addition, the polymer or blend of polymers selected should have a glass transition temperature below the decomposition temperature of the PVF.

Each of the PVF and layer immediately bonded to the PVF can contain up to about 50 weight % of fillers, colorants, and other additives, to impart the desired opacity, color or decorative effect to the final construction, or to modify the physical properties. Such addivitives can, for example, be incorporated into the PEKK layer of the laminar structures, to permit a substantially clear layer of PVF to remain as the surface layer. In the alternative, two or more layers of PVF can be used, in which a decorative pattern is printed in one or more of the inner PVF layers. In still another embodiment of the invention, appropriate dyes or pigments can be incorporated into the topmost PVF layer.

Either or both of the laminar components (a) and (b) of the present invention can also include one or more conventional additives such as stabilizers and inhibitors of oxidative, thermal, and ultraviolet light degradation; lubricants and mold release agents, fibrous and particulate fillers and reinforcements, nucleating agents, plasticizers, and the like, each used in the quantities typical of polymeric films of the type used in the present constructions, as will be known to those skilled in the art.

The PVF and PEKK layers are first laminated together. A variety of laminating techniques can be used. However, adhesive lamination has been found to be particularly effective. A wide variety of adhesives can be used, such as acrylics, polyesters, polyamides, epoxies, urethanes, silicones and rubbers. In general, the thickness of an adhesive layer should be no greater than about 12 micrometers, and is typically about from 2 to 7 micrometers. Acrylic adhesives are preferred for use in the present invention.

After preparation of the laminate of components (a) and (b), the resulting composite is shaped into substantially its final desired configuration and backfilled with a molding resin. Depending on the complexity of the molded shape desired, these operations can be carried out sequentially or substantially simultaneously. Typically, conventional thermoforming techniques and equipment are used, such as vacuum forming equipment. For a relatively simple shape, the laminate can be placed in a mold and simultaneously shaped and backfilled with the molding resin.

The molding resin used can vary widely. However, to fully realize the advantages of the present invention, the melting point of the filling resin is greater than the decomposition temperature of the PVF layer, or greater than about 200° C. With the intermediate layer of PEKK in the present structures, melting temperatures for the molding resin can be as high as two times the decomposition temperature of the PVF surface layers, or about 400° C. Representative polymers which can be used for this component include, for example, PEKK, polyetherimides such as those commercially available from General Electric Company as Ultem 1000, polycarbonates, such as those commercially available from General Electric Company as Lexan, and other conventional molding resins such as polyvinyl chloride, polycarbonate, polystyrene, acrylonitrile-butadienestyrene, polyethylene, polypropylene, polyethylene terephthalate glycol, nylon, thermoplastic polyimides and RIM (Reactive Injection Molding) urethanes. The molding resin can optionally contain a blowing agent to provide a foamed substrate in the final molded configuration. The blowing agents which can be used are known to those skilled in the art as being compatible with the particular polymer used for this component of the laminar structure. For example, if PEKK is used for the substrate, a foaming agent such as the calcium salt of phenyl tetrazole can be used, generally in combination with a nucleating agent such as boron trinitride.

The laminar structures of the present invention permit the preparation of shaped articles which can be used for aircraft interior applications in which a combination of light weight, low flammability, low smoke release and high temperature resistance is required. This combination of properties, including the superior performance characteristics of PVF films, has previously been thought to be unattainable in view of the relatively low melting point of PVF. However, with the presently required intermediate layer between the PVF and the molding resin, as noted above, molding resins for the in its stead can be used having a melting point as high as two times the decomposition temperature of the PVF without depreciating the performance characteristics of the PVF film.

The present invention is further illustrated by the following specific Examples and Control Examples.

EXAMPLE 1

A PVF/PEKK laminate was prepared from PVF film having a thickness of 50 micrometers (Du Pont Tedlar ® type TPD20BE5) coated with 0.0025 mm acrylic adhesive (Du Pont 68080) and 0.254 cm thick PEKK film (terephthalyl (T):isophthalyl (I)=60:40). The PEKK film was substantially amorphous and contained 15.5 wt. % filler consisting of 11.5 wt. % titanium dioxide (Du Pont R101), 0.0015 wt. % anthraquinone red dye (Ciba Geigy Filester Red RBA), 0.003 wt. % spinal blue pigment (Ferro V3285) and 4 wt. % silica alumina ceramic (Zeelan Industries Zeospheres type 200).

The adhesive-coated PVF and the PEKK films were placed in a platen press set to 163° C. for 3 minutes under 860 MPa pressure. The resulting laminate was cut into 7.62 cm by 12.7 cm blanks and placed into the female cavity (moving portion of the mold) of a 7.62 cm by 12.7 cm by 0.635 cm thick injection mold that had a top fan gate of (0.35 cm thick by 0.41 cm long) and which was heated to 135° C. The mold was closed and PEKK resin was injection molded behind the laminate, thereby simultaneously forming the laminate to the desired shape and backfilling. The PEKK resin had a T:I ratio of 60/40, a melt index of 33 g/10 min. at 340° C. (as measured by ASTM D1238 using a 4500 g weight), and contained 12.3 wt. % filler consisting of 9.25 wt. % titanium dioxide (Du Pont R101), 0.0018 wt. % anthraquinone red dye (Ciba Geigy Filester Red RBA), 0.01 wt. % spinal blue pigment (Ferro V3285) and 3 wt. % silica alumina ceramic (Zeelan Industries Zeospheres type 200).

The profile of the 170 g capacity injection molding machine was as follows: Rear 339° C., Center 350° C., Front 345° C., Nozzle 345° C., Boost 3 sec., Injection 20 sec., Hold 60 sec., Boost Injection Pressure 8.3 MPa, Injection Pressure 6.9 MPa, Ram Speed fast, Screw Speed 60 rpm and Back Pressure 0.34 MPa.

the resulting part was completely filled out and clad with the PVF film. The thickness of the backfilled PEKK material was 0.29 cm. No discernable delamination between the molding resin and the laminate was observed as determined by examination of the PEKK-/PEKK interface using SEM (scanning electron microscopy) cryogenically fractured cross-sections. Adhesion is defined as no discernable separation between the laminate/molding resin interface in the SEM or by the inability to insert a surgical blade a distance greater than 1.3 cm between the laminate from the molded part without tearing or damaging the laminate. There were no signs of deterioration or yellowing of the PVF film as determined visually and by color measurements using CIE Lab scale, D65 illuminant, spherical optics, specular included using the starting laminate as a standard. Results are as follows: dL=−.16, da=0, db=−0.02, dE=0.16. A dE value less than 0.5 is considered to be non-detectable by the human eye.

EXAMPLE 2

The general procedure of Example 1 was repeated, except that the molding resin used for backfilling was a polyetherimide resin (General Electric Ultem 1000). The molding profile was as follows: Rear 327° C., Center 340° C., Front 344° C., Nozzle 346° C., Boost 3 sec., Injection 20 sec., Hold 40 sec., Boost Injection Pressure 4.1 MPa, Injection Pressure 3.5 MPa, Ram Speed fast, Screw Speed 60 rpm and Back Pressure 0.34 MPa.

The resulting part was completely filled out and clad with the PVF film. The thickness of the backfilled polyetherimide material was greater than 0.29 cm. Adhesion between the laminate and the polyetherimide resin was generally good as demonstrated by SEM using the method described in Example 1.

EXAMPLE 3

If the general procedure of Example 1 is repeated, using polycarbonate as the backfilling injection molding resin, similar results will be obtained.

EXAMPLE 4

The general procedure of Example 1 was repeated, except that the molding resin used for backfilling was a polyetheretherketone resin (ICI Victrex type 380G). The resulting part was completely filled out and clad with PVF film. Adhesion between the laminate and the resin was poor as defined by observable fractures in the scanning electron micrographs using the method described in Example 1.

EXAMPLE 5

If the general procedure of Example 1 is repeated, using a foamable molding resin as described below, the indicated results will be obtained.

A PVF/PEKK laminate of the type fabricated in Example 1 is placed into the female cavity of the same mold as in Example 1. Polyetherketoneketone resin containing (T:I=60/40, melt index=40 g/10 min. at 340° C., ASTM D1238, 4500 g weight) containing 0.5 wt. % boron trinitride nucleating agent and 0.5 wt. % of calcium salt of 5 phenyl tetrazole as a foaming agent is injection molded behind the laminate using the same injection molding equipment as in Example 1 except that the nozzle is equipped with a mechanical shut off valve to prevent back flow. The molding profile is as follows: Rear 327° C., Center 340° C., Front 344° C., Nozzle 346° C., Boost 3 sec., Injection 20 sec., Hold 40 sec., Boost Injection Pressure MPa, Injection Pressure MPa, Ram Speed fast, Screw Speed 60 rpm and Back Pressure 0.34 MPa. The resulting foamed part is completely filled out and clad with the PVF film. The backfilled foamed PEKK resin will have a thickness of greater than 0.29 cm.

EXAMPLE 6

A 0.5 mm thick PVF/PEKK laminate was prepared as in Example 1 using 0.42 mm PEKK sheet of the same type as in Example 1 and 0.08 mm PVF film (Du Pont Tedlar® type TJW30AM9) coated with 0.0025 mm acrylic adhesive (Du Pont 68080). This laminate was vacuum thermoformed into the shape of an insert having a 12.1 cm top diameter, 3.1 cm high, 10.4 cm bottom diameter having a raised bottom insert 7.0 cm in diameter by 0.6 cm high. Thermoforming equipment consisted of a thermoformer equipped with ceramic heaters set to 218° C. and a male mold having the same inner dimensions of the formed part. Using an oven dwell time of 25 sec., the PVF/PEKK laminated was heated to 193° C. and then drawn into shape using a vacuum of 94.5 MPa. This insert was placed into the moving portion of center gated, water heated dish mold having a 12.2 cm top diameter, 3.8 cm high sides, 10.5 cm bottom diameter with a raised bottom insert 7.1 cm in diameter by 0.5 cm high. Mold temperature was 110° C. The mold was closed and PEKK resin (having a melt index of 40 g/10 min. at 340° C.) was injection molded behind the laminate. The 170 g capacity injection molding machine profile was as follows: Rear 330° C., Center 340° C., Front 345° C., Nozzle 340° C., Boost 3 sec., Injection 20 sec., Hold 60 sec., Boost Injection Pressure 10.3 MPa, Injection Pressure 9.6 MPa, Ram Speed fast, Screw Speed 60 rpm and Back Pressure 0.34 MPa. The resulting part was completely filled out and clad with PVF film. Adhesion was determined to be acceptable as determined by attempts to physically separate the laminate from the molding resin layer by the method described in Example 1.

EXAMPLE 7

A 0.31 mm PVF/PEKK laminate was prepared as in Example 1 using 0.23 mm PEKK film of the type described in Example 1 and 0.08 mm adhesive coated PVF film of the type described in Example 6. This laminate was thermoformed into the shape of a rectangle 35.2 cm long, 17.5 cm wide, 0.8 cm high having a 3.8 cm long by 1.9 cm wide by 0.5 mm indentation centered 3.9 cm from one edge. Thermoforming was done as in Example 6 using a male mold at room temperature having the following dimensions: 34.6 cm long, 16.9 cm wide, 0.77 cm high having a 4.4 cm long by 2.4 cm wide by 0.8 mm indentation centered 3.6 cm from one edge. Using an injection molding machine having 4.4 MN of clamping force and 1.5 kg capacity, the insert was cut in the indentation to accommodate the mold gating and placed in the stationary side of a water heated injection mold. The mold had the same dimensions as the insert but with ribs designed into the moving side of the mold while the stationary side was identical to the insert except for being textured and in the middle of the indentation area was the gate. The mold was closed and PEKK resin of the type used in Example 1 molded behind the insert. The injection molding machine profile was as follows: Rear 340° C., Center 357° C., Nozzle 313° C., Boost 3 sec., Injection 20 sec., Hold 60 sec., Boost Injection Pressure 12.4 MPa, Injection Pressure 12.4 MPa, Ram Speed fast, Screw Speed 60 rpm, Back Pressure .34 MPa and Mold Temperature 182° C. The resulting decorated part replicated the mold texture and had good adhesion between the molding resin and the insert as determined by physically attempting to separate the laminate from the molded part as in Example 1 and the SEM method described in Example 1. Such a part can be used as the oxygen compartment door for an aircraft passenger surface unit.

We claim:

1. A molded laminar structure comprising, and bonded together in the order specified,
   (a) at least one layer of polyvinyl fluoride film having a thickness of about from 12.5 to 200 micrometers;
   (b) at least one layer bonded to (a) having a thickness of about from 25 to 500 micrometers and consisting essentially of at least one substantially amorphous polymer selected from
      (i) polycarbonate
      (ii) polyaryletherketoneketone consisting essentially of repeating units of the formula:

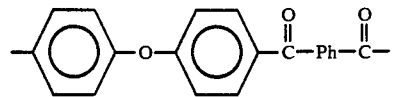

wherein Ph is either the 1,4-phenylene, the 1,3-phenylene group or mixtures thereof, the ratio of 1,4-phenylene groups to 1,3-phenylene groups being about from 70:30 to 0:100;
      (iii) polyarylate and
      (iv) polyvinyl chloride alloy; and
   (c) a polymeric substrate having thickness of at least about 500 micrometers, and a processing temperature of at least about 200° C., layer (c) having been bonded to a laminate of layer (a) adhesively bonded to layer (b).

2. A laminar structure of claim 1 wherein the adhesive used to bond layers (a) and (b) is an acrylic adhesive.

3. A laminar structure of claim 2 wherein the adhesive has a thickness of about from 2 to 50 micrometers.

4. A laminar structure of claim 1 wherein layer (b) consists essentially of polyaryletherketoneketone.

5. A laminar structure of claim 1 wherein layer (b) consists essentially of polycarbonate.

6. A laminar structure of claim 1 wherein the polymeric substrate has a processing temperature below about 400° C.

7. A laminar structure of claim 1 wherein the polymeric substrate is substantially amorphous.

8. A laminar structure of claim 1 wherein the substrate is foamed.

9. A laminar structure of claim 1 wherein layer (b) is foamed.

* * * * *